United States Patent
Liu et al.

(10) Patent No.: US 11,748,873 B2
(45) Date of Patent: Sep. 5, 2023

(54) PRODUCT DEFECT DETECTION METHOD, DEVICE AND SYSTEM

(71) Applicant: GOERTEK INC., Shandong (CN)

(72) Inventors: Jie Liu, Shandong (CN); Li Ma, Shandong (CN); Liang Zhang, Shandong (CN)

(73) Assignee: GOERTEK INC., Shandong (CN)

( * ) Notice: Subject to any disclaimer, the term of this patent is extended or adjusted under 35 U.S.C. 154(b) by 441 days.

(21) Appl. No.: 17/250,263

(22) PCT Filed: Aug. 26, 2020

(86) PCT No.: PCT/CN2020/111327
§ 371 (c)(1),
(2) Date: Dec. 22, 2020

(87) PCT Pub. No.: WO2021/135302
PCT Pub. Date: Jul. 8, 2021

(65) Prior Publication Data
US 2021/0374941 A1    Dec. 2, 2021

(30) Foreign Application Priority Data
Dec. 30, 2019    (CN) .......................... 201911397513.X (51) Int. Cl.
*G06T 7/00*      (2017.01)
*G06T 7/136*     (2017.01)
(Continued)

(52) U.S. Cl.
CPC ......... *G06T 7/001* (2013.01); *G01N 21/8851* (2013.01); *G06F 18/214* (2023.01);
(Continued)

(58) Field of Classification Search
CPC ......... G06T 7/001; G06T 7/0004; G06T 7/11; G06T 7/136; G06T 7/70;
(Continued)

(56) References Cited

U.S. PATENT DOCUMENTS

2007/0052964 A1*    3/2007 Uesugi ................. B21C 51/005
                                                         356/430
2008/0298670 A1*    12/2008 Nakagaki ............. G06T 7/0004
                                                         382/149
(Continued)

FOREIGN PATENT DOCUMENTS

CN    107643295 A    1/2018
CN    108509976 A    9/2018
(Continued)

*Primary Examiner* — Bobbak Safaipour
(74) *Attorney, Agent, or Firm* — LKGlobal | Lorenz & Kopf, LLP (57) ABSTRACT

A product defect detection method, device and system are disclosed. The product defect detection method comprises: constructing a defect detection framework including a classification network, a locating detection network and a judgment network; training the classification network by using a sample image of a product containing different defect types to obtain a classification network capable of classifying the defect types existing in the sample image; training the locating detection network by using a sample image of a product containing different defect types to obtain a locating detection network capable of locating a position of each type of defect in the sample image; inputting an acquired product image into the defect detection framework, inputting a classification result and a detection result obtained into the judgment network to judge whether the product has a defect, and detecting a defect type and a defect position when the product has a defect.

20 Claims, 5 Drawing Sheets

(51) Int. Cl.
　　*G06T 7/11*　　　　(2017.01)
　　*G06T 7/70*　　　　(2017.01)
　　*G01N 21/88*　　　(2006.01)
　　*G06N 3/08*　　　　(2023.01)
　　*G06F 18/214*　　　(2023.01)
　　*G06F 18/2431*　　(2023.01)
　　*G06F 18/2413*　　(2023.01)
　　*G06V 10/42*　　　(2022.01)
　　*G06V 10/764*　　 (2022.01)
　　*G06V 10/774*　　 (2022.01)
　　*G06V 10/82*　　　(2022.01)

(52) U.S. Cl.
　　CPC .... *G06F 18/2431* (2023.01); *G06F 18/24133* (2023.01); *G06N 3/08* (2013.01); *G06T 7/0004* (2013.01); *G06T 7/11* (2017.01); *G06T 7/136* (2017.01); *G06T 7/70* (2017.01); *G06V 10/431* (2022.01); *G06V 10/764* (2022.01); *G06V 10/774* (2022.01); *G06V 10/82* (2022.01); *G01N 2021/8854* (2013.01); *G01N 2021/8887* (2013.01); *G06T 2207/20021* (2013.01); *G06T 2207/20081* (2013.01); *G06T 2207/20084* (2013.01)

(58) Field of Classification Search
　　CPC . G06T 2207/20021; G06T 2207/20081; G06T 2207/20084; G06T 2207/20056; G01N 21/8851; G01N 2021/8854; G01N 2021/8887; G01N 21/01; G06F 18/214; G06F 18/24133; G06F 18/2431; G06F 18/24317; G06N 3/08; G06N 3/045; G06N 20/10; G06V 10/431; G06V 10/764; G06V 10/774; G06V 10/82
　　See application file for complete search history.

(56) References Cited

U.S. PATENT DOCUMENTS

| | | |
|---|---|---|
| 2016/0169802 A1 | 6/2016 | Ahner et al. |
| 2021/0089823 A1* | 3/2021 | Iio ........................ G06V 10/764 |
| 2021/0150696 A1* | 5/2021 | Bidault ................. G06N 3/045 |
| 2021/0374936 A1* | 12/2021 | Koopman ................ G06T 7/11 |
| 2021/0374940 A1* | 12/2021 | Liu ....................... G06V 10/774 |
| 2022/0138488 A1* | 5/2022 | Sampson ............... G06N 3/045 |
| | | 382/110 |
| 2022/0309639 A1* | 9/2022 | Liu ....................... G06V 10/225 |

FOREIGN PATENT DOCUMENTS

| | | |
|---|---|---|
| CN | 109741295 A | 5/2019 |
| CN | 109741296 A | 5/2019 |
| CN | 109767431 A | 5/2019 |
| CN | 110487802 A | 11/2019 |
| CN | 110490842 A | 11/2019 |
| CN | 111044525 A | 4/2020 |
| CN | 111060520 A | 4/2020 |
| KR | 101838664 B1 | 3/2018 |

\* cited by examiner

PRODUCT DEFECT DETECTION METHOD, DEVICE AND SYSTEM

CROSS REFERENCE TO RELATED APPLICATIONS

This application is a U.S. National Stage entry under 35 U.S.C. § 371 based on International Application No. PCT/CN2020/111327, filed on Aug. 26, 2020, which claims priority to Chinese Patent Application No. 201911397513.X, filed on Dec. 30, 2019. These priority applications are hereby incorporated herein in their entirety by reference.

TECHNICAL FIELD

This Application pertains to a product defect detection method, device and system.

BACKGROUND

In the traditional precision manufacturing industry, product defect detection is generally completed by manual inspection. In a typical manufacturing plant, nearly 30% of the employees are inspection personnel. Due to the large labor demand, there is often a shortage of human resources; moreover, the work intensity of manual inspection is high, and the inspection quality is easy to fluctuate due to fatigue. Therefore, automated inspection solutions of machines that have stable inspection quality, consistent results, and are not affected by human factors will surely be welcomed by the precision manufacturing industry. In addition, other objects, desirable features and characteristics will become apparent from the subsequent summary and detailed description, and the appended claims, taken in conjunction with the accompanying drawings and this background.

SUMMARY

The objective of the embodiments of the present disclosure is to provide a product defect detection method, device and system.

According to an aspect of the present disclosure, a product defect detection method is provided. The method comprises:

constructing a defect detection framework including a classification network, a locating detection network and a judgment network;

training the classification network by using a sample image of a product containing different defect types to obtain a classification network capable of classifying the defect types existing in the sample image;

training the locating detection network by using a sample image of a product containing different defect types to obtain a locating detection network capable of locating a position of each type of defect in the sample image; and when performing product defect detection, inputting an acquired product image into the defect detection framework, using the classification network to classify the defect types in the product image and using the locating detection network to locate a position of each type of defect in the product image, inputting a classification result and a detection result obtained into the judgment network to judge whether the product has a defect, and detecting a defect type and a defect position when the product has a defect.

According to another aspect of the present disclosure, a product defect detection device is provided. The device comprises:

a preprocessing unit configured to construct a defect detection framework including a classification network, a locating detection network and a judgment network; train the classification network by using a sample image of a product containing different defect types to obtain a classification network capable of classifying the defect types existing in the sample image; and train the locating detection network by using a sample image of a product containing different defect types to obtain a locating detection network capable of locating a position of each type of defect in the sample image; and a defect detection unit configured to, when performing product defect detection, input an acquired product image into the defect detection framework, use the classification network to classify the defect types in the product image and use the locating detection network to locate a position of each type of defect in the product image, input a classification result and a detection result obtained into the judgment network to judge whether the product has a defect, and detect a defect type and a defect position when the product has a defect.

According to yet another aspect of the present disclosure, a product defect detection system is provided. The system comprises: a memory and a processor;

the memory stores computer executable instructions;

when the computer executable instructions are executed, the processor executes the product defect detection method.

According to still yet another aspect of the present disclosure, a computer readable storage medium is provided. One or more computer programs are stored on the computer readable storage medium, and the product defect detection method is implemented when the one or more computer programs are executed.

The embodiments of present disclosure can achieve at least the following technical effects: A defect detection framework is constructed with a classification network, a locating detection network and a judgment network. In the process of constructing the defect detection framework, a classification network and a locating detection network are provided based on the product defect type, so that in the product defect detection process, the defects that may exist in the product image can be classified using the classification algorithm first, and then on the basis of the defect classification, the locating detection algorithm is used to quickly locate the defect position, and thus it can be accurately detected whether the product has a defect through two-stage detection, and when the product has a defect, the defect type and defect position are detected.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Now, various embodiments of the present disclosure will be described in detail with reference to the drawings. It should be noted that, unless specified otherwise, the relative arrangements of the members and steps, mathematical formulas and numerical values described in these embodiments do not limit the scope of the present disclosure.

The following description of at least one embodiment is actually for illustrative purposes only, and is not intended to limit the present disclosure and application or use thereof in any way.

The techniques, methods and devices well known to a person skilled in the related arts may not be discussed in detail. However, when applicable, such techniques, methods and devices should be deemed as a part of the description.

In all the examples shown and discussed herein, any specific value should be interpreted as illustrative only rather than restrictive. Therefore, other examples in the embodiments may have different values.

It should be noted that similar reference numerals and letters in the following drawings represent similar items. Therefore, once an item is defined in a drawing, it may not be further discussed in the subsequent drawings.

First Embodiment

Figure 1:
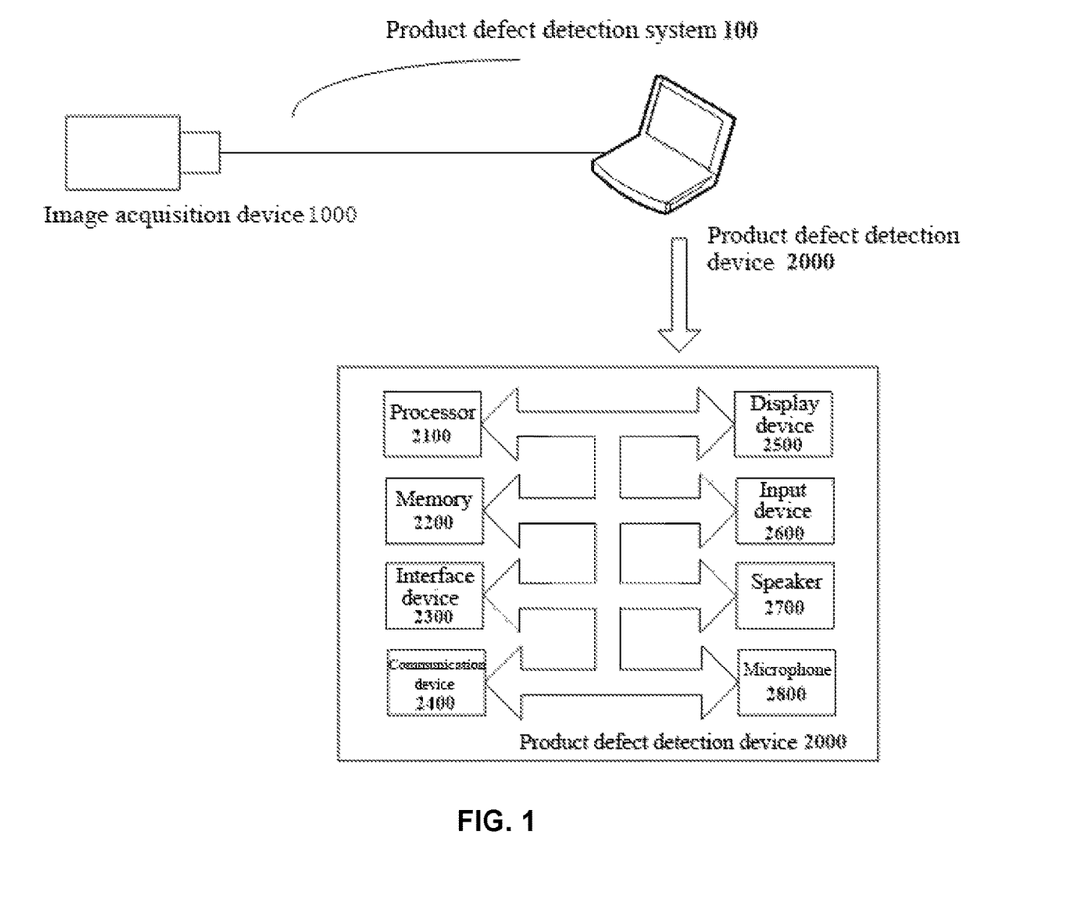
FIG. 1 is a block diagram of the hardware configuration of a product defect detection system according to an embodiment of the present disclosure.

FIG. 1 is a block diagram of the hardware configuration of a product defect detection system 100 according to an embodiment of the present disclosure.

As shown in FIG. 1, the product defect detection system 100 comprises an image acquisition device 1000 and a product defect detection device 2000.

The image acquisition device 1000 is configured to acquire a product image and provide the acquired product image to the product defect detection device 2000.

The image acquisition device 1000 may be any imaging device capable of taking pictures, such as a camera, etc.

The product defect detection device 2000 may be any electronic device, such as a PC, a notebook computer, a server, etc.

In the present embodiment, referring to FIG. 1, the product defect detection device 2000 may comprise a processor 2100, a memory 2200, an interface device 2300, a communication device 2400, a display device 2500, an input device 2600, a speaker 2700, a microphone 2800, etc.

The processor 2100 may be a mobile version processor. The memory 2200 includes, for example, ROM (Read Only Memory), RAM (Random Access Memory), nonvolatile memory such as a hard disk, etc. The interface device 2300 includes, for example, a USB interface, a headphone interface, etc. The communication device 2400 can, for example, perform wired or wireless communication. The communication device 2400 may include short-range communication devices, for example, any device that performs short-range wireless communication based on a short-range wireless communication protocol such as Hilink protocol, WiFi (IEEE 802.11 protocol), Mesh, Bluetooth, ZigBee, Thread, Z-Wave, NFC, UWB, LiFi, etc. The communication device 2400 may also include a remote communication device, for example, any device that performs WLAN, GPRS, 2G/3G/4G/5G remote communication. The display device 2500 is, for example, a liquid crystal display, a touch screen, etc. The display device 2500 is configured to display the product image acquired by the image acquisition device 1000. The input device 2600 may include, for example, a touch screen, a keyboard, etc. The user can input/output voice information through the speaker 2700 and the microphone 2800.

In the present embodiment, the memory 2200 of the product defect detection device 2000 is configured to store instructions for controlling the processor 2100 to operate to at least execute the product defect detection method according to any embodiment of the present disclosure. A person skilled in the art can design instructions according to the solutions disclosed in the present disclosure. It is well known in the art how the instructions control the processor to operate, and thus will not be described in detail here.

Although multiple devices of the product defect detection device 2000 are shown in FIG. 1, the present disclosure may only involve some of them. For example, the product defect detection device 2000 only involves the memory 2200, the processor 2100 and the display device 2500.

In the present embodiment, the image acquisition device 1000 is configured to acquire a product image and provide it to the product defect detection device 2000, and the product defect detection device 2000 implements the product defect detection method according to any embodiment of the present disclosure based on the image.

It will be appreciated that, although FIG. 1 only shows one image acquisition device 1000 and one product defect detection device 2000, it does not mean to limit their respective quantities. The product defect detection system 100 may comprise a plurality of image acquisition devices 1000 and/or product defect detection devices 2000.

Second Embodiment

In the product manufacturing process, the products obtained often have various forms of defects due to factors such as instability of upstream process, insufficient mechanical positioning accuracy and the environment in the plant, etc. Taking wire mesh products as an example, the defect categories of wire mesh products mainly include four types of defect: breakage, mesh deviation, impurities and double mesh.

Among them, the breakage defect is caused by the broken mesh wire or the deformation of the mesh hole. Some breakage defects appear to be a much larger mesh hole than normal mesh holes, and some other breakage defects appear to be similar to normal mesh holes in area but much different from normal mesh holes in shape. The mesh deviation defect is caused by the mesh wire not overlapping the workpiece. The mesh deviation also includes a subtype of fine mesh deviation defect which is caused by a small amount of mesh wire not overlapping due to the slight rotation of the mesh cloth when the mesh cloth is attached. The impurity defect is caused by excess mesh raw materials left on the wire mesh or floating objects in the workshop falling down on the wire mesh in a scattered manner. In the image the impurity defect generally appears black and is similar to the mesh wire. Since the impurities and the mesh wires in the image have the same color and some impurities are very small, the detection of impurity defects is also difficult. The double mesh defect is typically generated when two or more wire meshes are placed on a workpiece at the same time, and it is quite different from a normal product.

With respect to the problem of product defects as described above, the general concept of the embodiments of the present disclosure is as follows: take the image classification algorithm based on deep learning as the core, and then on the basis of image classification, use the target detection algorithm based on deep learning to quickly locate the defect position, thereby accurately detecting whether the product has a defect, and detect the type and position of the defect.

In the present embodiment, the wire mesh product is taken as an example to illustrate specific technical details, but the technical solutions of the present embodiment are not limited to scenarios of detecting defects in wire mesh products.

Figure 2:
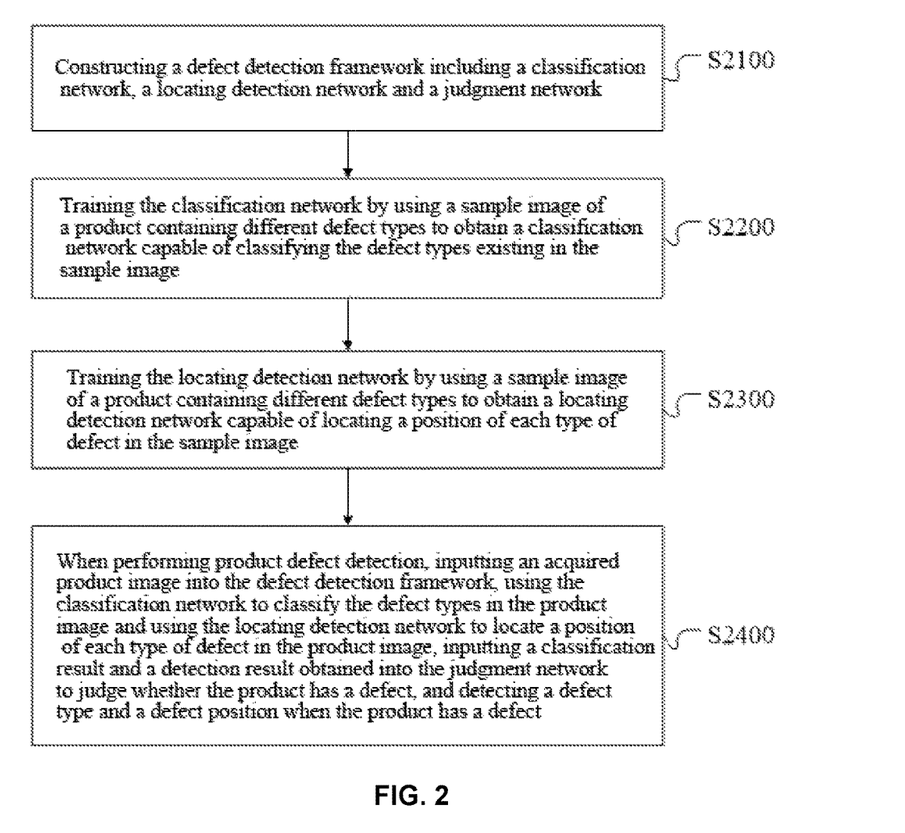
FIG. 2 is a flowchart of a product defect detection method according to an embodiment of the present disclosure.

FIG. 2 is a flowchart of a product defect detection method according to an embodiment of the present disclosure. As shown in FIG. 2, the method in the present embodiment comprises:

S2100, constructing a defect detection framework including a classification network, a locating detection network and a judgment network.

The classification network, the locating detection network and the judgment network are serially connected in sequence.

The classification network is used to classify the defect types of products. For the image of a wire mesh product, the classification network in the present embodiment can classify four types of defects: breakage, mesh deviation, impurity, and double mesh defects. Among them, the classification network has a very high accuracy in classifying double mesh defects. The classification accuracy of breakage defects and mesh deviation defects is the next highest, and the classification accuracy of impurity defects is the lowest. Therefore, in the present embodiment, there is no need to use the locating detection network to further locate and detect the double mesh defects classified by the classification network, but it is necessary to use the locating detection network to further locate and detect the breakage defects, mesh deviation defects, and impurity defects classified by the classification networks. It can be understood that, when needed, a locating detection network for double mesh defects can be established in the framework for further detection.

Since the area of a fine mesh deviation defect of the wire mesh product is very small, it is very easy for the classification network to make judgment errors. Therefore, in the present embodiment, in order to reduce the missed detection of fine mesh deviation defects, the locating detection network used to detect fine mesh deviation defects is different from the locating detection networks used to detect breakage defects, mesh deviation defects and impurity defects. In the present embodiment, the locating detection network used to detect fine mesh deviation defects uses the shape features of fine mesh deviation defects as the input of the locating detection network, while the locating detection networks used to detect breakage defects, mesh deviation defects, and impurity defects use the entire image as the input.

The judgment network is used to comprehensively judge whether the product has a defect according to the classification results output by the classification network and the detection results output by the locating detection networks, and when there is a defect, detect the defect type and mark the defect position.

S2200: training the classification network by using a sample image of a product containing different defect types to obtain a classification network capable of classifying the defect types existing in the sample image.

In the present embodiment, the classification network is implemented using an image segmentation algorithm based on deep learning. For example, network models such as Alxnet, Vgg, Resnet, Inception net, Densenet, Googlenet, Nasnet and Xception can be used to build a classification network. Since the Densenet network model has the characteristics of fast classification speed and high classification accuracy, the present embodiment preferably uses the Densenet (Dense Convolutional Network) network model to build the classifier.

S2300: training the locating detection network by using a sample image of a product containing different defect types to obtain a locating detection network capable of locating a position of each type of defect in the sample image.

In the present embodiment, the locating detection network is implemented using a target detection algorithm based on deep learning, such as the Mask R-CNN algorithm. Mask R-CNN is a typical multi-instance segmentation algorithm, which first extracts image features using the backbone network, and then generates a small number of candidate regions through the RPN (Region Proposal Network) based on the feature pyramid, and finally predicts the object category and the circumscribe rectangle with respect to each candidate region.

In some embodiments, the locating detection network may be a multi-class detection network, namely, locating and detecting multiple defect types of a product is completed by one locating detection network. Of course, the locating detection network may also be a two-class detection network. The output result of the two-class detection network is 0 or 1. When the locating detection network is a two-class detection network, the quantity of locating detection networks should be set according to the quantity of product defect types. For example, when the output result of a two-class locating detection network used to detect breakage defects is 0, it means that the product does not have a breakage defect; when the output result is 1, it means that the product has a breakage defect.

Take the wire mesh product as an example, a locating detection network is provided for breakage defects, a locating detection network is provided for mesh deviation defects, and a locating detection network is provided for impurity defects. Due to the large differences in the flawed features of impurity, breakage and mesh deviation, the accuracy of multi-class detection using Mask R-CNN algorithm is not high, while the accuracy of two-class detection using Mask R-CNN algorithm is high. Therefore, in the present embodiment, preferably, the locating detection network is set as a two-class detection network, and a corresponding locating detection network is provided for each defect type.

In some embodiments, the backbone network of the Mask R-CNN algorithm may use the resnet101 network, the quantity of candidate regions output by the RPN network is set to 1000, and the mask branch performs prediction on the top 100 candidate regions with high scores.

It should be noted that, in view of the situation that fine mesh deviation defects of wire mesh products are more difficult to detect than breakage defects, mesh deviation defects and impurity defects, the locating detection network for detecting fine mesh deviation defects provided in the present embodiment has shape feature extraction function, classification calculation function and logical judgment function, and uses the shape feature extraction function to extract the shape feature of the image region that may have fine mesh deviation defects, uses the classification calculation function to classify the image region with respect to whether each image region has the fine mesh deviation defect based on the extracted shape feature of each image region, and uses the logical judgment function to obtain the classification result of each image region and determine whether the product has a fine mesh deviation defect based on the classification result.

S2400: when performing product defect detection, inputting an acquired product image into the defect detection framework, using the classification network to classify the defect types in the product image and using the locating detection network to locate a position of each type of defect in the product image, inputting a classification result and a detection result obtained into the judgment network to judge whether the product has a defect, and detecting a defect type and a defect position when the product has a defect.

In some embodiments, after the product image is acquired, image preprocessing may be performed on the product image, for example, size adjustment, noise reduction processing, etc. are performed on the product image, and the preprocessed product image is input into the defect detection framework.

In the present embodiment, a defect detection framework is constructed using a classification network, a locating detection network and a judgment network. In the process of constructing the defect detection framework, a classification network and a locating detection network are provided based on the product defect type, so that in the product defect detection process, the defects that may exist in the product image can be classified using the classification algorithm first, and then on the basis of the defect classification, the locating detection algorithm is used to quickly locate the defect position, and thus it can be accurately detected whether the product has a defect through two-stage detection, and when the product has a defect, the defect type and defect position are detected.

The detection method of the present embodiment can meet the requirements of the production line and improve the efficiency of the production line.

Third Embodiment

The embodiment of the present disclosure further provides a product defect detection method. In the present embodiment, constructing a defect detection framework in the above step S2100 comprises S2110~S2120:

S2110: setting a quantity of the locating detection network and a judgment rule of the judgment network according to a quantity of the product defect types and a classification accuracy rate of the classification network for classifying each defect type.

Taking the wire mesh product as an example, the defect types of the wire mesh product include five types: breakage, mesh deviation, impurity, double mesh and fine mesh deviation. The accuracy rates of classification networks for these five types of defects from high to low are: the accuracy rate of classification for the double mesh defect>the accuracy rate of classification for the breakage or mesh deviation defect>the accuracy rate of classification for the impurity defect>the accuracy rate of classification for the fine mesh deviation. For example, when the classification network is used to classify and detect a product image including these five types of defects, among the classification results, the classification value corresponding to the double mesh defect is above 0.99, the classification value corresponding to the breakage or mesh deviation defect is above 0.90, the classification value corresponding to the impurity defect is less than 0.70, and the classification value corresponding to the fine mesh deviation is close to 0. The classification value indicates the accuracy rate of classification for the defect by the classification network. The larger the classification value is, the higher the accuracy rate of defect classification by the classification network is, and the more reliable the classification result is. The smaller the classification value is, the lower the accuracy rate of defect classification by the classification network is, and the less reliable the classification result is.

In this case, the quantity of locating detection networks can be set to four, and correspondingly, the judgment network includes four judgment rules.

S2120: setting each locating detection network to associate with a defect type of the product, and setting each judgment rule to associate with a defect type of the product.

In the present embodiment, the product defect types include a first type of defect, a second type of defect and a third type of defect. The first type of defect is a defect for which the classification accuracy rate of the classification network is greater than a first threshold value; the second type of defect is a defect for which the classification accuracy rate of the classification network is not greater than a first threshold value, and the third type of defect is a defect for which the classification accuracy rate of the classification network is less than a second threshold value. The second threshold value is less than the first threshold value. The first threshold value and the second threshold value can be set according to the classification accuracy rate of the classification network with respect to the defect types. Taking the wire mesh product as an example, the first threshold value can be set to 0.90, and the second threshold value can be set to 0.50.

In the present embodiment, the product is a wire mesh product, and the types of product defects include double mesh defects, breakage defects, mesh deviation defects, impurity defects and fine mesh deviation defects. The breakage defect and the mesh deviation defect are the first type of defect, the impurity defect is the second type of defect, the fine mesh deviation defect is the third type of defect, and the double mesh defect is the fourth type of defect. The classification network has a very high classification accuracy rate for the fourth type of defect, and the classification network has a higher classification accuracy rate for the fourth type of defect than for the first type of defect.

Figure 3:
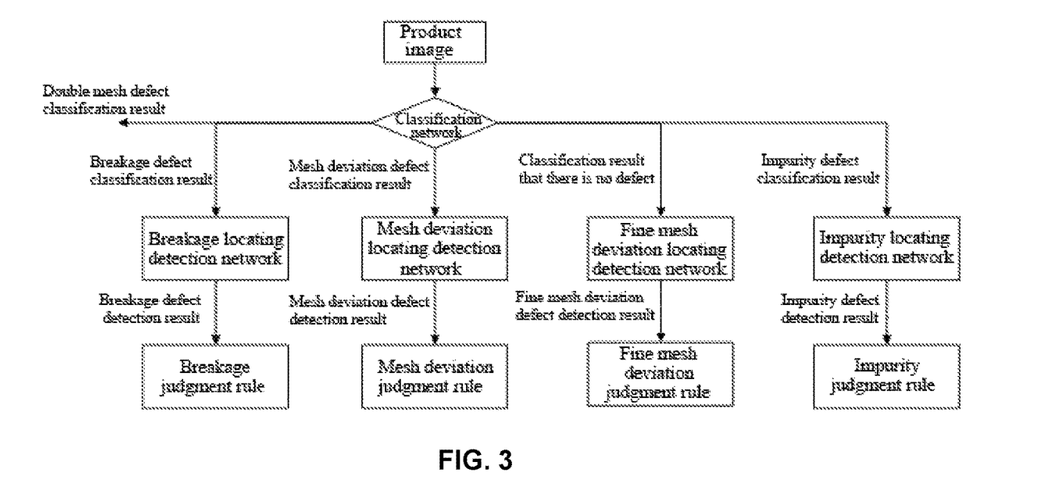
FIG. 3 is a schematic diagram of constructing a defect detection framework according to an embodiment of the present disclosure.

As stated above, the present embodiment can construct a classification network in the defect detection framework based on the above steps S2110~S2120. FIG. 3 shows a defect detection framework corresponding to a wire mesh product. As shown in FIG. 3, for a wire mesh product, the classification network classifies the defects in the product image and can output five classification results: there is a double-mesh defect in the image; there is a breakage defect in the product image; there is a mesh deviation defect in the product image; there is a impurity defect in the product image; and there is no defect in the product image. It should be noted that, in the present embodiment, the classification ability of the classification network for the fine mesh deviation defect is close to 0, namely, the classification network cannot classify fine mesh deviation defects. Therefore, for the wire mesh products, the classification network can output the above five classification results. The locating detection network corresponding to each detection result include a breakage locating detection network, a mesh deviation locating detection network, a fine mesh deviation locating detection network and an impurity locating detection network. The corresponding judgment rules in the judgment network include a breakage judgment rule, a mesh deviation judgment rule, a fine mesh deviation judgment rule and an impurity judgment rule.

Since the classification network can accurately distinguish the double mesh defect, the defect locating detection need not to be further performed on the product image that only has double mesh defects, and the defect type and defect positions can be directly detected by the classification network. However, the classification network has relatively low classification accuracy rates for breakage defects, mesh deviation defects and impurity defects, and cannot classify fine mesh deviation defects. Therefore, when the classification network outputs a classification result indicating that there is a breakage defect, a classification result indicating that there is a mesh deviation defect, a classification result indicating that there is an impurity defect, and a classification result indicating that there is no defect (at this point, the product image may have a fine mesh deviation defect), the defect locating detection need to be further performed.

Fourth Embodiment

The present embodiment further provides a product defect detection method. In the present embodiment, when the classification result of the classification network indicates that the product image has the first type of defect, the above step S2400 further comprises S2410~S2420:

S2410: using a first locating detection network associated with the first type of defect to detect a position of the first type of defect in the product image and obtain a detection result.

In the present embodiment, the Mask R-CNN algorithm is used to build the first locating detection network, and when the Mask R-CNN algorithm is used to detect the position of the first type of defect in the product image, one of the following two detection results can be obtained, and then it is judged whether the product has the first type of defect based on the detection result according to the first judgment rule in the judgment network, and locates the defect position when the first type of defect exists.

Among them, the first kind of detection result is that a locating box for locating the position of the first type of defect has been detected, and the second kind of detection result is that a locating box for locating the position of the first type of defect has not been detected.

S2420: using a first judgment rule associated with the first type of defect to judge whether the product has the first type of defect.

The specific judgment process of the first judgment rule is that, if the detection result output by the first locating detection network is the first kind of detection result, it is determined that the product has the first type of defect, and the first type of defect is marked using the locating box; if the detection result output by the first locating detection network is the second kind of detection result, it is determined that the product has the first type of defect, and the first type of defect is not marked.

It should be noted that, since in the present embodiment, the classification accuracy rate of the classification network for the first type of defect is greater than the first threshold value, namely, the classification network has a higher classification accuracy rate for the first type of defect, it is considered that as long as the classification result of the classification network indicates that the product has the first type of defect, no matter whether the first locating detection network has detected the position of the first type of defect when further detecting the product image using the first locating detection network, the judgment network will judge that the product image has the first type of defect. The difference lies in whether the first type of defect in the product image can be marked. Namely, if the first locating detection network has detected a locating box for locating the position of the first type of defect, the first type of defect is marked using the locating box so that the position of the first type of defect can be displayed according to the mark in actual usage. If the first locating detection network has not detected the locating box for locating the position of the first type of defect, the first type of defect cannot be marked at this point.

Figure 4:
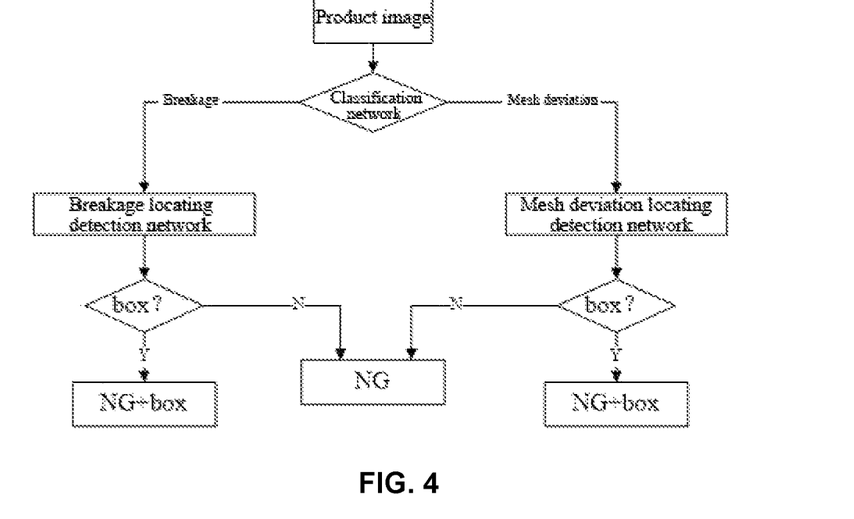
FIG. 4 is a flowchart of detecting breakage defects and mesh deviation defects according to an embodiment of the present disclosure.

As shown in FIG. 4, when the classification network is used to classify and detect the product image of the wire-mesh product, if the classification result output by the classification network indicates that the product image has breakage defects and mesh deviation defects, the breakage locating detection network and the mesh deviation locating detection network are respectively used to locate and detect the breakage defects and the mesh deviation defects in the product image, and the breakage judgment rule is used to judge whether the product image has a breakage defect, and the mesh deviation judgment rule is used to judge whether the product image has a mesh deviation defect.

Continuing to refer to FIG. 4, when the detection result output by the breakage locating detection network includes a locating box for locating the position of the breakage defect in the product image (i.e., the box in FIG. 4), it is judged that the product has a breakage defect and the product is an unqualified product (i.e., NG in FIG. 4), and the breakage defect is marked using the locating box. When the detection result output by the breakage locating detection network does not include a locating box for locating the position of the breakage defect in the product image, it is judged that the product has a breakage defect and the product is an NG product.

Similarly, when the detection result output by the mesh deviation detection network includes a box for locating the position of the mesh deviation defect in the product image, it is judged that the product has a mesh deviation defect and the product is an NG product, and the mesh deviation defect is marked using the box. When the detection result output by the mesh deviation detection network does not include the box for locating the position of the mesh deviation defect in the product image, it is judged that the product has a mesh deviation defect and the product is an NG product.

Fifth Embodiment

The present embodiment further provides a product defect detection method. In the present embodiment, when the classification result of the classification network indicates that there is a second type of defect in the product image, the above step S2400 further comprises S2430~S2440:

S2430: using a second locating detection network associated with the second type of defect to further detect whether there is a second type of defect in the product image, and obtain a detection result.

In the present embodiment, the Mask R-CNN algorithm is used to build the second locating detection network. Since the classification network has a relatively low classification accuracy rate for the second type of defect, the present embodiment uses the Mask R-CNN algorithm to further detect whether there is a second type of defect in the product image. At this point, one of the following two detection results can be obtained, and then it is judged whether the product has the second type of defect based on the detection result according to the second judgment rule in the judgment network, and locates the position of the second type of defect when the second type of defect exists.

Among them, the first kind of detection result is that a locating box for locating the position of the second type of defect has been detected, and the second kind of detection result is that a locating box for locating the position of the second type of defect has not been detected.

S2440: using a second judgment rule associated with the second type of defect to judge whether the product has the second type of defect.

The specific judgment process of the second judgment rule is as follows.

When the detection result output by the second locating detection network is the first kind of detection result, if an area of a region of the product image where the locating box is located is less than an area threshold value, it is determined that the product has a second type of defect, and the second type of defect is marked using the locating box. If the area of the region of the product image where the locating box is located is not less than the area threshold value, and a classification value in the classification result is less than a first preset value, it is determined that the product does not have the second type of defect. If the area of the region of the product image where the locating box is located is not less than the area threshold value, and the classification value in the classification result is not less than the first preset value, it is determined that the product has a second type of defect, and the second type of defect is marked using the locating box.

In the present embodiment, the area threshold value can be set according to the area of an image block where the image texture is located in the product image of a qualified product, and the area threshold value is smaller than the area of the image block where the image texture is located. The first preset value and the second preset value are set based on experience. Taking the wire mesh product as an example, assuming that in the product image of the qualified wire mesh product, an area of an image block corresponding to a normal grid is 100 pixel points, and the area threshold value can be set to 80 pixel points. According to experience, the first preset value is set to 0.50, the second preset value is set to 0.995, and the second preset value should be a value close to 1 so as to accurately detect whether there is an impurity defect in the product image.

Based on the above assumption, when the detection result output by the second locating detection network is the first kind of detection result, if the area of the region of the product image where the locating box is located is less than 80 pixel points, it is determined that the product has an impurity defect. If the area of the region of the product image where the locating box is located is not less than 80 pixel points, and the classification value of impurity defect in the classification result output by the classification network is less than 0.5, it is determined that the product does not have an impurity defect. If the area of the region of the product image where the locating box is located is not less than 80 pixel points, and the classification value of the impurity defect in the classification result output by the classification network is greater than 0.5, it is determined that the product has an impurity defect.

When the detection result output by the second locating detection network is the second kind of detection result, if a classification value in the classification result is less than a second preset value, it is determined that the product does not have the second type of defect; if the classification value in the classification result is not less than the second preset value, it is determined that the product has the second type of defect; wherein the first preset value is less than the second preset value.

Still based on the above assumptions, when the detection result output by the second locating detection network is the second kind of detection result, if the classification value of the impurity defect in the classification result output by the classification network is less than 0.995, it is determined that the product does not have an impurity defect; if the classification value of the impurity defect in the classification result output by the classification network is greater than 0.995, it is determined that the product has an impurity defect.

As shown in FIG. 3, when the classification network is used to classify and detect the product image of the wire mesh product, if the classification result output by the classification network indicates that the product image has an impurity defect, the impurity locating detection network is used to further locate and detect the impurity defect in the product image, and the impurity judgment rule is used to judge whether the product image has an impurity defect.

Figure 5:
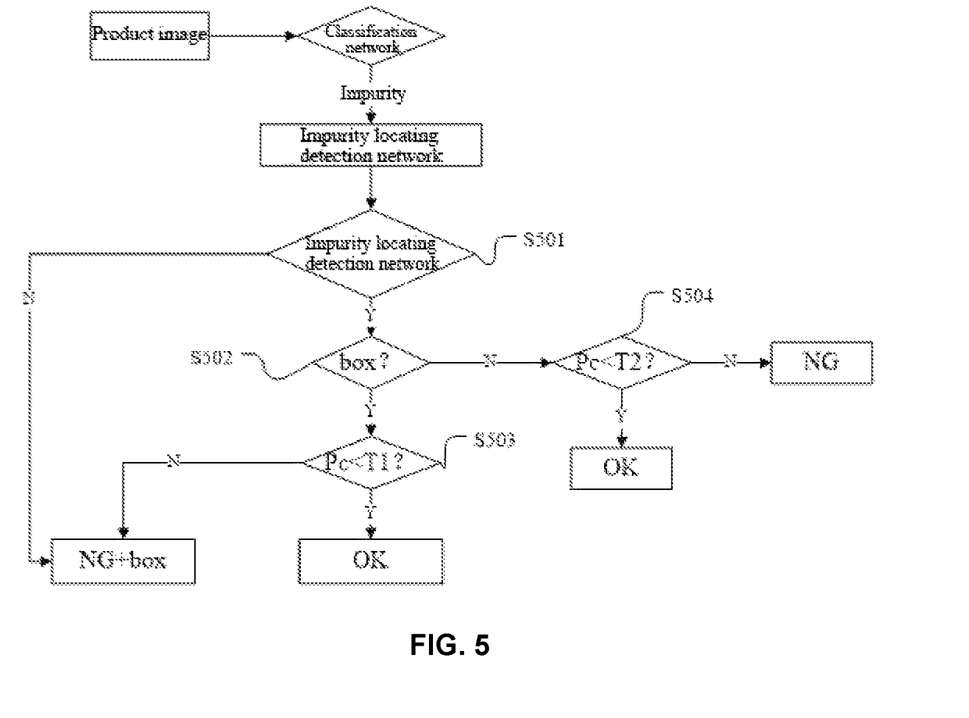
FIG. 5 is a flowchart of detecting impurity defects according to an embodiment of the present disclosure.

As shown in FIG. 5, the judgment process of the impurity judgment rule comprises:

S501: judging whether it is possible that there is no impurity in the product image according to the detection result output by the impurity locating detection network; when it is judged that it is impossible that there is no impurity (i.e., when it is judged that there is an impurity), it is judged that the product has an impurity defect, and the product is an unqualified (i.e., NG in FIG. 5) product, and the impurity defect is marked using the box in FIG. 5; S502 is executed when it is judged that there may be an impurity.

When the impurity locating detection network outputs the first kind of detection result, and the area of the region of the product image where the locating box included in the first detection result is located is smaller than the area threshold value, it is determined that there is an impurity in the product image.

When the impurity locating detection network outputs the first kind of detection result, and the area of the region of the product image where the locating box included in the first detection result is located is not less than the area threshold value, it is determined that there may be no impurity in the product image.

When the impurity locating detection network outputs the second kind of detection result, it is judged that there may be no impurity in the product image.

S502: judging whether the detection result output by the impurity locating detection network includes a locating box for locating the impurity defect.

S502 is executed when the impurity locating detection network outputs the first kind of detection result and when the impurity locating detection network outputs the second kind of detection result, and the first kind of detection result includes a locating box for locating the impurity defect while the second kind of detection result does not include a locating box for locating the impurity defect.

Therefore, the above two cases are judged through S502. When the detection result includes a locating box for locating the impurity defect, S503 is executed; when the detection result does not include a locating box for locating the impurity defect, S504 is executed.

S503: judging whether the classification value Pc corresponding to the impurity defect output by the classification network is less than a first preset value T1.

If Pc is less than T1, it is determined that the product has no impurity defect and is a qualified (i.e., OK in FIG. 5) product; if Pc is not less than T1, it is determined that the product has an impurity defect and is an NG product.

S504: judging whether the Pc corresponding to the impurity defect output by the classification network is less than a second preset value T2, and if the Pc is less than T2, it is determined that the product does not have an impurity defect and is a qualified (OK) product. If Pc is not less than T2, it is determined that the product has an impurity defect and is an NG product.

Sixth Embodiment

The present embodiment further provides a product defect detection method. In the present embodiment, when the classification result of the classification network indicates that there is no defect in the product image, the above step S2400 further comprises S2450~S2460:

S2450: extracting a shape feature of the product image by using a third locating detection network associated with the third type of defect, and detecting the third type of defect in the product image based on the shape feature to obtain the detection result.

In the present embodiment, a feature extraction structure and a support vector machine (SVM) classifier are used to build the third locating detection network. Since it is difficult for the classification network to detect the third type of defect in the product image, the present embodiment is based on the morphological characteristic that the texture of the third type of defect is significantly different from the normal texture of the product. Taking the wire mesh product as an example, the texture morphology of the fine mesh deviation defect (i.e., the third type of defect) is significantly different from the texture morphology of the normal mesh hole of the product, and the feature extraction structure can be used to extract the texture feature of each image block where the product texture in the product image is located. After extracting the texture feature of each image block, the SVM classifier is used to classify all the image blocks, and the detection result is output based on the classification results of all the image blocks.

Among them, the first kind of detection result is that the third type of defect and a locating box for locating the position of the third type of defect have been detected, and the second kind of detection result is that the third type of defect has not been detected.

In some embodiments, the shape feature of the product image can be extracted by the following method:

performing binarization processing on the product image, and performing region detection on an obtained binary image to obtain multiple image blocks where the product texture is located; and detecting a minimum circumscribed rectangle of each image block, calculating a Fourier descriptor of a target image region of the product image where each minimum circumscribed rectangle is located, and using the Fourier descriptor as the shape feature of the product image.

Figure 6:
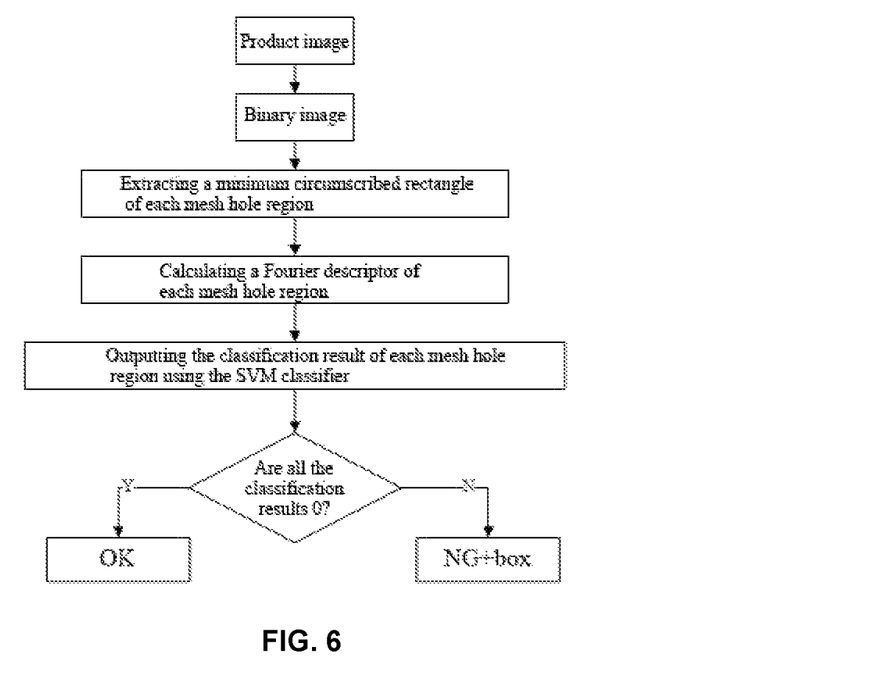
FIG. 6 is a flowchart of image processing and detection of a wire mesh product including fine mesh deviation defects according to an embodiment of the present disclosure.

As shown in FIG. 6, taking the wire mesh product as an example, in the wire mesh product image, the Fourier descriptor of the mesh hole region (i.e., the image block where the product texture in the product image is located as described above) can be used as the shape feature of the mesh hole region. The essence of the Fourier descriptor is to use the Fourier transform of the object boundary information to transform the contour feature of the object from the spatial domain to the frequency domain, and transform the object contour of any size into a feature vector of a fixed length so as to input it into the SVM classifier for category judgment.

After the shape feature is extracted, the detection result is obtained by the following scheme:

the Fourier descriptor is inputted into a classifier of the third locating detection network, classifying each image block by using the classifier, and obtaining a classification result of each image block;

if classification results of all image blocks are a first value, the third locating detection network outputs the second kind of detection result as the detection result;

if classification results of one or more image blocks are a second value, the third locating detection network outputs the first kind of detection result as the detection result, wherein an minimum circumscribed rectangle of an image block whose classification result is the second value is used as the locating box in the first kind of detection result.

Referring to FIG. 6, the Fourier descriptor of each mesh hole region in the wire mesh product image is output as the shape feature of the mesh hole region to the SVM classifier, and the SVM classifier outputs the classification result of each mesh hole region. If the classification results of all mesh hole regions are 0 (the first value), it is determined that the wire mesh product is a qualified (i.e., OK in FIG. 6) product. If the classification results of one or more mesh hole regions are 1 (the second value), it is determined that the wire mesh product is an unqualified (i.e., NG in FIG. 6) product, and the minimum circumscribed rectangular block of the mesh hole region having a classification result of 1 is used as the locating box (i.e., the box in FIG. 6), the fine mesh deviation defects in the wire mesh product image is marked using the box.

S2460: using a third judgment rule associated with the third type of defect to judge whether the product has the third type of defect.

The specific judgment process of the third judgment rule is as follows. If the detection result output by the third locating detection network is the first kind of detection result, it is determined that the product has the third type of defect, and the third type of defect is marked using the locating box. If the detection result output by the third locating detection network is the second kind of detection result, it is determined that the product does not have the third type of defect.

Figure 7:
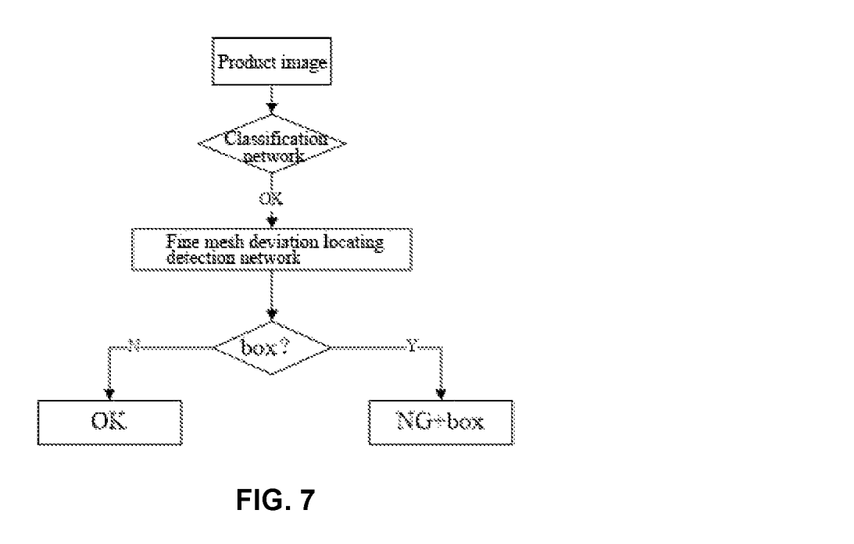
FIG. 7 is a flowchart of detecting fine mesh deviation defects according to an embodiment of the present disclosure.

In the application scenario where the product is a wire mesh product, the process of locating and detecting a fine mesh deviation defect is as shown in FIG. 7.

Referring to FIG. 7, when the classification network is used to classify and detect the product image of the wire mesh product, if the classification result output by the classification network indicates there is no defect in the product image, the fine mesh deviation locating detection network is used to locate and detect the fine mesh deviation defect in the product image, and the fine mesh deviation judgment rule is used to judge whether the product image has a fine mesh deviation defect.

Continuing to refer to FIG. 7, when the detection result output by the fine mesh deviation locating detection network includes a locating box for locating the position of the fine mesh deviation defect in the product image (i.e., the box in FIG. 7), it is judged that the product has a fine mesh deviation defect and the product is an unqualified (i.e., NG in FIG. 7) product, and the fine mesh deviation defect is marked using the box. When the detection result output by the fine mesh deviation locating detection network does not include the box for locating the position of the fine mesh deviation in the product image, it is judged that the product does not have a fine mesh deviation defect, and the product is a qualified (i.e., OK in FIG. 7) product.

Seventh Embodiment

Figure 8:
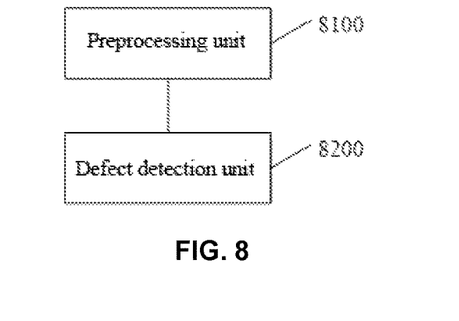
FIG. 8 is a block diagram of the structure of a product defect detection device according to an embodiment of the present disclosure.

FIG. 8 is a block diagram of the structure of a product defect detection device according to an embodiment of the present disclosure. As shown in FIG. 8, the device in the present embodiment comprises:

a preprocessing unit 8100 configured to construct a defect detection framework including a classification network, a locating detection network and a judgment network; train the classification network by using a sample image of a product containing different defect types to obtain a classification network capable of classifying the defect types existing in the sample image; and train the locating detection network by using a sample image of a product containing different defect types to obtain a locating detection network capable of locating a position of each type of defect in the sample image; and a defect detection unit 8200 configured to, when performing product defect detection, input an acquired product image into the defect detection framework, use the classification network to classify the defect types in the product image and use the locating detection network to locate a position of each type of defect in the product image, input a classification result and a detection result obtained into the judgment network to judge whether the product has a defect, and detect a defect type and a defect position when the product has a defect.

In some embodiments, the preprocessing unit 8100 is further configured to set a quantity of the locating detection network and a judgment rule of the judgment network according to a quantity of the product defect types and a classification accuracy rate of the classification network for classifying each defect type; and set each locating detection network to associate with a defect type of the product, and set each judgment rule to associate with a defect type of the product;

wherein the product defect types include a first type of defect, a second type of defect and a third type of defect, the first type of defect is a defect for which the classification accuracy rate of the classification network relative to a defect type is greater than a first threshold value; the second type of defect is a defect for which the classification accuracy rate of the classification network relative to a defect type is not greater than a first threshold value, and the third type of defect is a defect for which the classification accuracy rate of the classification network relative to a defect type is less than a second threshold value;

the product defect types further include a fourth type of defect, and when the classification network classifies the defect type as the fourth type of defect, it is determined that the product has the fourth type of defect, and the locating detection network is no longer used to detect the fourth type of defect. The classification network has a very high classification accuracy rate for the fourth type of defects, and the classification network has a higher classification accuracy rate for the fourth type of defects than for the first type of defect.

In some embodiments, the defect detection unit 8200 comprises a first detection module and a first judgment module;

the first detection module is configured to, when a classification result of the classification network indicates that the product image has the first type of defect, use a first locating detection network associated with the first type of defect to detect a position of the first type of defect in the product image and obtain a detection result, wherein the detection result includes the following two kinds: a first kind of detection result that a locating box for locating the position of the first type of defect has been detected; and a second kind of detection result that a locating box for locating the position of the first type of defect has not been detected; and correspondingly, the first judgment module is configured to, use a first judgment rule associated with the first type of defect to judge whether the product has the first type of defect; if it is the first kind of detection result, determine that the product has the first type of defect, and mark the first type of defect using the locating box; if it is the second kind of detection result, determine that the product has the first type of defect, and not mark the first type of defect.

In some embodiments, the defect detection unit 8200 comprises a second detection module and a second judgment module;

the second detection module is configured to, when a classification result of the classification network indicates that the product image has the second type of defect, use a second locating detection network associated with the second type of defect to further detect whether the product image has the second type of defect and obtain a detection result, wherein the detection result includes the following two kinds: a first kind of detection result that a locating box for locating the position of the second type of defect has been detected; and a second kind of detection result that a locating box for locating the position of the second type of defect has not been detected; and correspondingly, the second judgment module is configured to, use a second judgment rule associated with the second type of defect to judge whether the product has the second type of defect; when it is the first kind of detection result, if an area of a region of the product image where the locating box is located is less than an area threshold value, determine that the product has the second type of defect, and mark the second type of defect using the locating box; if the area of the region of the product image where the locating box is located is not less than the area threshold value, and a classification value in the classification result is less than a first preset value, determine that the product does not have the second type of defect; if the area of the region of the product image where the locating box is located is not less than the area threshold value, and a classification value in the classification result is not less than the first preset value, determine that the product has the second type of defect, and mark the second type of defect using the locating box; when it is the second kind of detection result, if a classification value in the classification result is less than a second preset value, determine that the product does not have the second type of defect; if a classification value in the classification result is not less than the second preset value, determine that the product has the second type of defect, wherein the first preset value is less than the second preset value.

In some embodiments, the defect detection unit 8200 comprises a third detection module and a third judgment module;

the third detection module is configured to, when a classification result of the classification network indicates that there is no defect in the product image, use a third locating detection network associated with the third type of defect to extract a shape feature of the product image, and detect the third type of defect in the product image based on the shape feature and obtain a detection result, wherein the detection result includes the following two kinds: a first kind of detection result that the third type of defect and a locating box for locating the position of the third type of defect have been detected; and a second kind of detection result that the third type of defect has not been detected; and correspondingly, the third judgment module is configured to, use a third judgment rule associated with the third type of defect to judge whether the product has the third type of defect; if it is the first kind of detection result, determine that the product has the third type of defect, and mark the third type of defect using the locating box; if it is the second kind of detection result, determine that the product does not have the third type of defect.

In some embodiments, the third detection module is further configured to perform binarization processing on the product image, and perform region detection on an binary image obtained to obtain multiple image blocks where the product texture is located; detect a minimum circumscribed rectangle of each image block, calculate a Fourier descriptor of a target image region of the product image where each minimum circumscribed rectangle is located, and use the Fourier descriptor as the shape feature of the product image.

The third detection module is further configured to input the Fourier descriptor into a classifier of the third locating detection network, classify each image block by using the classifier, and obtain a classification result of each image block;

if classification results of all image blocks are a first value, output the second kind of detection result as the detection result by the third locating detection network;

if classification results of one or more image blocks are a second value, output the first kind of detection result as the detection result by the third locating detection network, wherein an minimum circumscribed rectangle of an image block whose classification result is the second value is used as the locating box in the first detection result.

For the specific implementing mode of each unit and module in the device embodiment, please refer to the related content of the method embodiment, which will not be repeated here.

Eighth Embodiment

Figure 9:
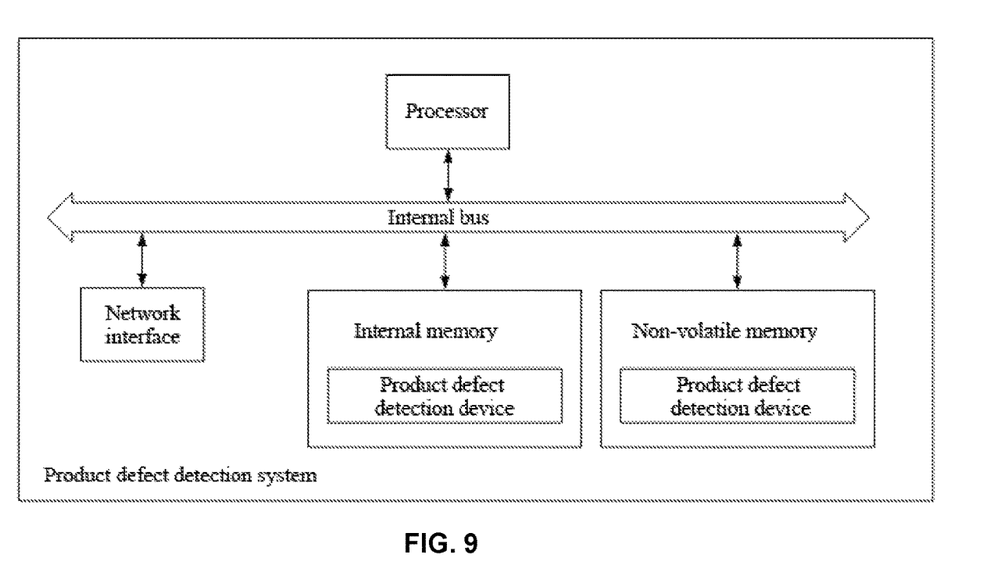
FIG. 9 is a block diagram of the structure of a product defect detection system according to an embodiment of the present disclosure.

FIG. 9 is a block diagram of the structure of a product defect detection system according to an embodiment of the present disclosure. As shown in FIG. 9, at the hardware level, the product defect detection system includes a processor, and optionally an internal bus, a network interface, and a memory. Among them, the memory may include an internal memory, such as high-speed random access memory (RAM), and may also include non-volatile memory, such as at least one disk memory.

The processor, network interface and memory can be connected to each other via an internal bus. The internal bus can be an ISA (Industry Standard Architecture) bus, a PCI (Peripheral Component Interconnect) bus or an EISA (Extended Industry Standard Architecture) bus, etc. The bus can be divided into address bus, data bus, control bus, etc. For ease of presentation, only one bidirectional arrow is shown in FIG. 9, but it does not mean that there is only one bus or one type of bus.

Memory is used to store programs. Specifically, the program may include program codes, and the program codes include computer executable instructions. The memory may include internal memory and non-volatile memory, and provide instructions and data to the processor.

The processor reads the corresponding computer program from the non-volatile memory into the internal memory and then runs it to form a product defect detection device on a logical level. The processor executes the program stored in the memory to implement the product defect detection method as described above.

The method performed by the product defect detection device disclosed in the embodiment shown in FIG. 9 of this specification can be applied to a processor or implemented by the processor. The processor may be an integrated circuit chip having signal processing capabilities. In the implementation process, the steps of the product defect detection method described above can be completed by integrated logic circuits (in the form of hardware) or instructions (in the form of software) in the processor. The processor may be a general-purpose processor including a central processing unit (CPU), a network processor (NP), etc.; it may also be a digital signal processor (DSP), an application specific dedicated integrated circuit (ASIC), a field-programmable gate array (FPGA) or other programmable logic devices, discrete gates or transistor logic devices, discrete hardware components, which can implement or execute the methods, steps, and logical block diagrams disclosed in the embodiments of this specification. The general-purpose processor may be a microprocessor or any conventional processor or the like. The steps of the method disclosed in the embodiments of this specification can be directly embodied as hardware and executed by a decoding processor, or executed by a combination of hardware in the decoding processor and software modules. The software module can be located in a storage medium well known in the art such as random access memory, flash memory, read-only memory, programmable read-only memory, or electrically erasable programmable memory, registers, etc. The storage medium is located in the memory, and the processor reads the information in the memory and cooperates with its hardware to complete the steps of the above product defect detection method in combination with.

The present disclosure further provides a computer readable storage medium.

The computer readable storage medium stores one or more computer programs. The one or more computer programs include instructions. When the instructions are executed by the processor, the product defect detection method as described above can be implemented.

In order to clearly describe the technical solutions of the embodiments of the present disclosure, in the embodiments of the present disclosure, words such as "first" and "second" are used to distinguish the same or similar items having basically the same function and effect. A person skilled in the art can understand that the words "first" and "second" are not intended to limit the quantity and execution order.

The above merely describe particular embodiments of the present disclosure. By the teaching of the present disclosure, a person skilled in the art can make other modifications or variations based on the above embodiments. A person skilled in the art should appreciate that, the detailed description above is only for the purpose of better explaining the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A product defect detection method, comprising:
constructing a defect detection framework including a classification network, a locating detection network and a judgment network;
training the classification network by using a sample image of a product containing different defect types to obtain a classification network capable of classifying the defect types existing in the sample image;
training the locating detection network by using a sample image of a product containing different defect types to obtain a locating detection network capable of locating a position of each type of defect in the sample image; and
when performing product defect detection, inputting an acquired product image into the defect detection framework, using the classification network to classify the defect types in the product image and using the locating detection network to locate a position of each type of defect in the product image, inputting a classification result and a detection result obtained into the judgment network to judge whether the product has a defect, and detecting a defect type and a defect position when the product has a defect.

2. The method according to claim 1, wherein constructing a defect detection framework comprises:
setting a quantity of the locating detection network and a judgment rule of the judgment network according to a quantity of the product defect types and a classification accuracy rate of the classification network for classifying each defect type; and
setting each locating detection network to associate with a defect type of the product, and setting each judgment rule to associate with a defect type of the product;
wherein the product defect types include a first type of defect, a second type of defect and a third type of defect, the first type of defect is a defect for which the classification accuracy rate of the classification network relative to a defect type is greater than a first threshold value; the second type of defect is a defect for which the classification accuracy rate of the classification network relative to a defect type is not greater than a first threshold value, and the third type of defect is a defect for which the classification accuracy rate of the classification network relative to a defect type is less than a second threshold value.

3. The method according to claim 1, wherein the product defect types further include a fourth type of defect, and when the classification network classifies the defect type as the fourth type of defect, determining that the product has the fourth type of defect, and no longer using the locating detection network to detect the fourth type of defect.

4. The method according to claim 2, wherein using the classification network to classify the defect types in the product image and using the locating detection network to locate a position of each type of defect in the product image comprises:
when a classification result of the classification network indicates that the product image has the first type of defect, using a first locating detection network associated with the first type of defect to detect a position of the first type of defect in the product image and obtain a detection result, wherein the detection result includes the following two kinds:
a first kind of detection result that a locating box for locating the position of the first type of defect has been detected; and
a second kind of detection result that a locating box for locating the position of the first type of defect has not been detected.

5. The method according to claim 4, wherein inputting a classification result and a detection result obtained into the judgment network to judge whether the product has a defect, and detecting a defect type and a defect position when the product has a defect comprises:
using a first judgment rule associated with the first type of defect to judge whether the product has the first type of defect;
if it is the first kind of detection result, determining that the product has the first type of defect, and marking the first type of defect using the locating box; and
if it is the second kind of detection result, determining that the product has the first type of defect, and not marking the first type of defect.

6. The method according to claim 2, wherein using the classification network to classify the defect types in the product image and using the locating detection network to locate a position of each type of defect in the product image comprises:
when a classification result of the classification network indicates that the product image has the second type of defect, using a second locating detection network associated with the second type of defect to further detect whether the product image has the second type of defect and obtain a detection result, wherein the detection result includes the following two kinds:
a first kind of detection result that a locating box for locating the position of the second type of defect has been detected; and
a second kind of detection result that a locating box for locating the position of the second type of defect has not been detected.

7. The method according to claim 6, wherein inputting a classification result and a detection result obtained into the judgment network to judge whether the product has a defect, and detecting a defect type and a defect position when the product has a defect comprises:
using a second judgment rule associated with the second type of defect to judge whether the product has the second type of defect;
when it is the first kind of detection result, if an area of a region of the product image where the locating box is located is less than an area threshold value, determining that the product has the second type of defect, and marking the second type of defect using the locating box; if the area of the region of the product image where the locating box is located is not less than the area threshold value, and a classification value in the classification result is less than a first preset value, determining that the product does not have the second type of defect; if the area of the region of the product image where the locating box is located is not less than the area threshold value, and a classification value in the classification result is not less than the first preset value, determining that the product has the second type of defect, and marking the second type of defect using the locating box; and when it is the second kind of detection result, if a classification value in the classification result is less than a second preset value, determining that the product does not have the second type of defect; if a classification value in the classification result is not less than the second preset value, determining that the product has the second type of defect, wherein the first preset value is less than the second preset value.

8. The method according to claim 2, wherein using the classification network to classify the defect types in the product image and using the locating detection network to locate a position of each type of defect in the product image comprises:

when a classification result of the classification network indicates that there is no defect in the product image, extracting a shape feature of the product image by using a third locating detection network associated with the third type of defect, and detecting the third type of defect in the product image based on the shape feature to obtain a detection result, wherein the detection result includes the following two types:

a first kind of detection result that the third type of defect and a locating box for locating the position of the third type of defect have been detected; and a second kind of detection result that the third type of defect has not been detected.

9. The method according to claim 8, wherein inputting a classification result and a detection result obtained into the judgment network to judge whether the product has a defect, and detecting a defect type and a defect position when the product has a defect comprises:

using a third judgment rule associated with the third type of defect to judge whether the product has the third type of defect;

if it is the first kind of detection result, determining that the product has the third type of defect, and marking the third type of defect using the locating box; and if it is the second kind of detection result, determining that the product does not have the third type of defect.

10. The method according to claim 8, wherein extracting a shape feature of the product image comprises:

performing binarization processing on the product image, and performing region detection on an binary image obtained to obtain multiple image blocks where a texture of the product is located; and detecting a minimum circumscribed rectangle of each image block, calculating a Fourier descriptor of a target image region of the product image where each minimum circumscribed rectangle is located, and using the Fourier descriptor as the shape feature of the product image.

11. The method according to claim 10, wherein detecting the third type of defect in the product image based on the shape feature to obtain a detection result comprises:

inputting the Fourier descriptor into a classifier of the third locating detection network, classifying each image block by using the classifier, and obtaining a classification result of each image block;

if classification results of all image blocks are a first value, outputting the second kind of detection result as the detection result by the third locating detection network; and if classification results of one or more image blocks are a second value, outputting the first kind of detection result as the detection result by the third locating detection network, wherein an minimum circumscribed rectangle of an image block whose classification result is the second value is used as the locating box in the first kind of detection result.

12. The method according to claim 2, wherein the product is a wire mesh product;

the product defect types include a breakage defect, a mesh deviation defect, an impurity defect, and a fine mesh deviation defect; and the breakage defect and the mesh deviation defect are selected as the first type of defect, the impurity defect is selected as the second type of defect, and the fine mesh deviation defect is selected as the third type of defect.

13. The method according to claim 3, wherein the product is a wire mesh product;

the product defect types also include a double mesh defect, and the double mesh defect is selected as a fourth type of defect.

14. The method according to claim 2, wherein the product is a mesh product;

the first threshold value is set to 0.90, and the second threshold value is set to 0.50.

15. The method according to claim 7, wherein the product is a wire mesh product;

the first preset value is set to 0.50, and the second preset value is set to 0.995.

16. A product defect detection device, comprising:

a preprocessing unit configured to construct a defect detection framework including a classification network, a locating detection network and a judgment network; train the classification network by using a sample image of a product containing different defect types to obtain a classification network capable of classifying the defect types existing in the sample image; and train the locating detection network by using a sample image of a product containing different defect types to obtain a locating detection network capable of locating a position of each type of defect in the sample image; and a defect detection unit configured to, when performing product defect detection, input an acquired product image into the defect detection framework, use the classification network to classify the defect types in the product image and use the locating detection network to locate a position of each type of defect in the product image, input a classification result and a detection result obtained into the judgment network to judge whether the product has a defect, and detect a defect type and a defect position when the product has a defect.

17. The device according to claim 16, wherein the preprocessing unit is further configured to set a quantity of the locating detection network and a judgment rule of the judgment network according to a quantity of the product defect types and a classification accuracy rate of the classification network for classifying each defect type; and set each locating detection network to associate with a defect type of the product, and set each judgment rule to associate with a defect type of the product;

wherein the product defect types include a first type of defect, a second type of defect and a third type of defect, the first type of defect is a defect for which the classification accuracy rate of the classification network relative to a defect type is greater than a first threshold value; the second type of defect is a defect for which the classification accuracy rate of the classification network relative to a defect type is not greater than a first threshold value, and the third type of defect is a defect for which the classification accuracy rate of the classification network relative to a defect type is less than a second threshold value; and the product defect types further include a fourth type of defect, and when the classification network classifies the defect type as the fourth type of defect, the preprocessing unit is further configured to determine that the product has the fourth type of defect, and no longer use the locating detection network to detect the fourth type of defect.

18. The device according to claim 17, wherein the defect detection unit further comprises a first detection module and a first judgment module;

the first detection module is configured to, when a classification result of the classification network indicates that the product image has the first type of defect, use a first locating detection network associated with the first type of defect to detect a position of the first type of defect in the product image and obtain a detection result, wherein the detection result includes the following two kinds: a first kind of detection result that a locating box for locating the position of the first type of defect has been detected; and a second kind of detection result that a locating box for locating the position of the first type of defect has not been detected;

correspondingly, the first judgment module is configured to, use a first judgment rule associated with the first type of defect to judge whether the product has the first type of defect; if it is the first kind of detection result, determine that the product has the first type of defect, and mark the first type of defect using the locating box; if it is the second kind of detection result, determine that the product has the first type of defect, and not mark the first type of defect;

the defect detection unit further comprises a second detection module and a second judgment module;

the second detection module is configured to, when a classification result of the classification network indicates that the product image has the second type of defect, use a second locating detection network associated with the second type of defect to further detect whether the product image has the second type of defect and obtain a detection result, wherein the detection result includes the following two kinds: a first kind of detection result that a locating box for locating the position of the second type of defect has been detected; and a second kind of detection result that a locating box for locating the position of the second type of defect has not been detected;

correspondingly, the second judgment module is configured to, use a second judgment rule associated with the second type of defect to judge whether the product has the second type of defect; when it is the first kind of detection result, if an area of a region of the product image where the locating box is located is less than an area threshold value, determine that the product has the second type of defect, and mark the second type of defect using the locating box; if the area of the region of the product image where the locating box is located is not less than the area threshold value, and a classification value in the classification result is less than a first preset value, determine that the product does not have the second type of defect; if the area of the region of the product image where the locating box is located is not less than the area threshold value, and a classification value in the classification result is not less than the first preset value, determine that the product has the second type of defect, and mark the second type of defect using the locating box; when it is the second kind of detection result, if a classification value in the classification result is less than a second preset value, determine that the product does not have the second type of defect; if a classification value in the classification result is not less than the second preset value, determine that the product has the second type of defect, wherein the first preset value is less than the second preset value;

the defect detection unit further comprises a third detection module and a third judgment module;

the third detection module is configured to, when a classification result of the classification network indicates that there is no defect in the product image, use a third locating detection network associated with the third type of defect to extract a shape feature of the product image, and detect the third type of defect in the product image based on the shape feature to obtain a detection result, wherein the detection result includes the following two kinds: a first kind of detection result that the third type of defect and a locating box for locating the position of the third type of defect have been detected; and a second kind of detection result that the third type of defect has not been detected;

correspondingly, the third judgment module is configured to, use a third judgment rule associated with the third type of defect to judge whether the product has the third type of defect; if it is the first kind of detection result, determine that the product has the third type of defect, and mark the third type of defect using the locating box; if it is the second kind of detection result, determine that the product does not have the third type of defect.

19. A product defect detection system, comprising: a memory and a processor;

the memory stores computer executable instructions;

when the computer executable instructions are executed, the processor executes the following product defect detection method:

constructing a defect detection framework including a classification network, a locating detection network and a judgment network;

training the classification network by using a sample image of a product containing different defect types to obtain a classification network capable of classifying the defect types existing in the sample image;

training the locating detection network by using a sample image of a product containing different defect types to obtain a locating detection network capable of locating a position of each type of defect in the sample image; and when performing product defect detection, inputting an acquired product image into the defect detection framework, using the classification network to classify the defect types in the product image and using the locating detection network to locate a position of each type of defect in the product image, inputting a classification result and a detection result obtained into the judgment network to judge whether the product has a defect, and detecting a defect type and a defect position when the product has a defect.

20. The system according to claim 19, wherein constructing a defect detection framework comprises:
setting a quantity of the locating detection network and a judgment rule of the judgment network according to a quantity of the product defect types and a classification accuracy rate of the classification network for classifying each defect type; and
setting each locating detection network to associate with a defect type of the product, and setting each judgment rule to associate with a defect type of the product;
wherein the product defect types include a first type of defect, a second type of defect and a third type of defect, the first type of defect is a defect for which the classification accuracy rate of the classification network relative to a defect type is greater than a first threshold value; the second type of defect is a defect for which the classification accuracy rate of the classification network relative to a defect type is not greater than a first threshold value, and the third type of defect is a defect for which the classification accuracy rate of the classification network relative to a defect type is less than a second threshold value.

* * * * *